United States Patent
Sameshima et al.

(10) Patent No.: US 7,041,724 B2
(45) Date of Patent: May 9, 2006

(54) RESOL-TYPE PHENOL RESIN COMPOSITION AND METHOD FOR CURING THE SAME

(75) Inventors: Kenichi Sameshima, Osaka (JP); Kunio Mori, Ichihara (JP); Tadashi Inoue, Ichihara (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 0 days.

(21) Appl. No.: 09/892,457

(22) Filed: Jun. 28, 2001

(65) Prior Publication Data

US 2002/0016441 A1 Feb. 7, 2002

(30) Foreign Application Priority Data

Jun. 30, 2000 (JP) .......................... P2000-198515

(51) Int. Cl.
*C08K 3/30* (2006.01)
*C08K 3/20* (2006.01)
*C08L 61/10* (2006.01)

(52) U.S. Cl. ...................... 524/419; 524/428; 524/433; 524/594

(58) Field of Classification Search ................ 524/433, 524/400, 419, 428, 594, 157
See application file for complete search history.

(56) References Cited

U.S. PATENT DOCUMENTS 2,869,194 A * 1/1959 Cooper ........................ 164/21
4,264,760 A * 4/1981 Meyer ......................... 528/230
4,785,040 A * 11/1988 Gupta et al. .................. 524/445
5,294,649 A * 3/1994 Gerber ........................ 523/145
5,336,723 A * 8/1994 Ikeda et al. .................. 525/139
5,551,961 A * 9/1996 Engen et al. .................. 51/298

FOREIGN PATENT DOCUMENTS

EP 0 747 169 A2 12/1996
GB 2 158 834 A 11/1985

OTHER PUBLICATIONS

Database WPI; Section Ch, Week 198109, Derwent Publication Ltd. XP-002180516 and JP 55-165944A;Dec. 24, 1980 (Japan).

* cited by examiner

*Primary Examiner*—Callie Shosho
(74) *Attorney, Agent, or Firm*—Armstrong, Kratz, Quintos, Hanson & Brooks, LLP

(57) ABSTRACT

The present invention provides a resol-type phenol resin composition which can be cured even in a low temperature range, using a curing accelerator which has no adverse effect on other materials or substances with which the resulting cured article is in contact, or a curing accelerator which requires a small amount of an additive. The composition comprises a resol-type phenol resin (A), an alkali earth metal oxide and/or an alkali earth metal hydroxide (B) (e.g. magnesium oxide, calcium hydroxide, barium hydroxide, etc.), and a salt (C) of a sulfur atom-containing oxo acid and a nitrogen atom-containing base (e.g. ammonium thiosulfate, etc.). This composition is cured at 10 to 110° C.

2 Claims, No Drawings

RESOL-TYPE PHENOL RESIN COMPOSITION AND METHOD FOR CURING THE SAME

BACKGROUND OF THE INVENTION

1. Field of the Invention

The present invention relates to a resol-type phenol resin composition which is used for adhesion, molding, formation of a laminated impregnated sheet or surface coating, or used as a binder for inorganic aggregate such as casting or refractory materials, and a method for curing the same.

2. Description of the Related Art

As a method for rapidly curing a resol-type commodity phenol resin as a thermosetting resin, for example, a method of curing with heating using an alkali substance such as sodium hydroxide, potassium hydroxide, magnesium hydroxide, calcium carbonate, calcium oxide, magnesium oxide or the like; a method known as an ester curing method using the above alkali substance in combination with ester or lactone, or a method known as an acid curing type curing method using various inorganic and organic acids have generally been known as methods of curing at a temperature ranging from about room temperature to 110° C.

The alkali and acid used in these methods remain and there is concern of them affecting the base material and aggregate. With regard to the object with which the resin is in contact, corrosion of the base material due to an acid, and adverse effects by an alkali such as sodium or potassium give rise to concern. Therefore, these methods cannot be used on some objects, or the surface the object with which the resin is to be brought into contact must be subjected to a pre-treatment. Furthermore, these methods have the drawback of requiring high temperature for a long time in order to completely cure.

BRIEF SUMMARY OF THE INVENTION

Accordingly, an object of the present invention is to provide a resol-type phenol resin composition which can be cured even in a low temperature range of from 10 to 110° C., using a curing accelerator which has no adverse effect on other materials or substances with which the resulting cured article is in cotact, or a curing accelerator which requires a small amount of an additive, and a method for curing the same.

The present inventors have carried out intensive studies to solve the problems described above and found that, when using a salt (C) of a sulfur atom-containing oxo acid and a nitrogen atom-containing base as a curing accelerator, preferably ammonium thiosulfate, in combination with a resol-type phenol resin (A) and an alkali earth metal oxide and/or an alkali earth metal hydroxide (B), the resol-type phenol resin (A) can be easily cured even in a low temperature range of from 10 to 110° C. by adding additives in a comparatively small amount of from 0.1 to 15 parts by weight based on 100 parts by weight of the resol-type phenol resin (A) and, moreover, there is no adverse effect on other materials or substances with which the resulting cured article is in contact, thus completing the present invention.

That is, the present invention provides a resol-type phenol resin composition comprising a resol-type phenol resin (A), an alkali earth metal oxide and/or an alkali earth metal hydroxide (B), and a salt (C) of a sulfur atom-containing oxo acid and a nitrogen atom-containing base, and a method for curing the resol-type phenol resin, which comprises curing the resol-type phenol resin composition at a temperature of from 10 to 110° C.

The resol-type phenol resin composition of the present invention has the following effects. It is cured even in a low temperature range from 10 to 110° C. and has no adverse effect on other materials or substances with which the resulting cured article is in contact, because a salt of a sulfur atom-containing oxo acid and a nitrogen atom-containing base is used as a curing accelerator and, moreover, the curing accelerator may be used in a small amount because alkali earth metal oxides and/or alkali earth metal hydroxides activate the curing accelerator.

DETAILED DESCRIPTION OF THE INVENTION

Examples of the resol-type phenol resin (A) used in the present invention include those obtained by reacting phenols such as phenol, cresol and bisphenol A with aldehydes such as formaldehyde, paraformaldehyde and glyoxazol in the presence of an alkali catalyst. Examples of the alkali catalyst include inorganic catalysts such as oxides and hydroxides of alkali metals and alkali earth metals; and organic catalysts such as amines and ammonia.

The alkali earth metal oxides and/or the alkali earth metal hydroxides (B) used in the present invention activate the function of a curing accelerator, the salt (C) of a sulfur atom-containing oxo acid and a nitrogen atom-containing base described below, and also serve as a filler to the control flow of a resin liquid.

Although the amount for smoothly curing the resin composition of the present invention is not specifically limited, the alkali earth metal oxide and/or the alkali earth metal hydroxide (B) are preferably added in an amount of 1 part by weight or more, and more preferably 5 parts by weight or more, based on 100 parts by weight of the resol-type phenol resin (A) in order to cure at a low curing temperature within a range from 10 to 110° C. However, even if they are added in a larger amount, problems such as defective curing and poor physical properties of cured article do not occur.

From the viewpoint of using the filler for controlling flow of the resin liquid, the alkali earth metal oxide and/or the alkali earth metal hydroxide (B) may be used in an amount which is several times larger than that of the resin, thereby to constitute almost all of the composition, but is preferably used in an amount of from 1 to 10000 parts by weight, particularly preferably from 5 to 5000 parts by weight, based on 100 parts by weight of the resol-type phenol resin (A).

Examples of the alkali earth metal oxide and/or the alkali earth metal hydroxide (B) include magnesium oxide, calcium oxide, barium oxide, magnesium hydroxide, calcium hydroxide and barium hydroxide. Among these, magnesium oxide, calcium hydroxide and barium hydroxide are preferred. These oxides and/or hydroxide may be in the form of a powder, or a granulate having a diameter of from about 2 to 6 mm. As the particle diameter of the alkali earth metal oxide and/or the alkali earth metal hydroxide (B) becomes smaller, the curing reaction proceeds more smoothly even if the salt (C) of the sulfur atom-containing oxo acid and the nitrogen atom-containing base is used in a small amount. Therefore, the amount can be appropriately controlled by taking the flowability of the resin liquid into consideration.

The salt (C) of the sulfur atom-containing oxo acid and the nitrogen atom-containing base used as the curing accelerator in the present invention will now be described. The oxo acid component in the salt (C) of the sulfur atom-containing oxo acid and the nitrogen atom-containing base may be preferably those which are less likely to have an effect on other materials with which the resulting cured article are in contact and on other added fillers, and examples thereof include thiosulfuric acid, dithionous acid, disulfurous acid, and polythionic acids such as dithionic acid, trithionic acid and tetrathionic acid. Among these acid components, thiosulfuric acid is particularly preferred because the physical properties of the cured article are less likely affected if the acid components remain in the cured article. Examples of the nitrogen atom-containing base in the salt (C) of the sulfur atom-containing oxo acid and the nitrogen atom-containing base include ammonia derivatives such as ammonia, hydroxylamine, hydrazine, phenylhydrazine and semicarbazide; aliphatic amines such as methylamine, dimethylamine, trimethylamine, ethylamine, n-propylamine, n-dipropylamine, n-tripropylamine, isopropylamine, diisopropylaminetriisopropylamine, n-butylamine, di-n-butylaminebutylamine and tri-n-butylamine; and aromatic amines such as aniline, diethylaniline and diphenylaniline. Among these nitrogen atom-containing bases, ammonia is preferred because of its high curing acceleration effect at low temperature. Specific examples of the salt (C) of the sulfur atom-containing oxo acid and the nitrogen atom-containing base include ammonium thiosulfate, ammonium dithionite, ammonium disulfite, ammonium dithionate, ammonium trithionate and ammonium tetrathionate. Among these salts, ammonium thiosulfate [$(NH_3)_2S_2O_3$] is particularly preferred.

The amount of the salt (C) of the sulfur atom-containing oxo acid and the nitrogen atom-containing base is preferably 0.1 parts by weight or more, and particularly preferably 0.2 parts by weight or more, based on 100 parts by weight of the resol-type phenol resin (A) because the curing reaction will proceed smoothly. The amount is preferably 15 parts by weight or less, and particularly preferably 5 parts by weight or less, based on 100 parts by weight of the resol-type phenol resin (A) because any remaining salt (C) of the sulfur atom-containing oxo acid and the nitrogen atom-containing base in the cured article will be less likely to have an effect on the physical properties (e.g. moisture absorption) of the cured article.

The resol-type phenol resin composition of the present invention can be obtained, for example, by only mixing three components (A), (B) and (C). The resulting resol-type phenol resin composition of the present invention is cured even at a low temperature within a range from 10 to 110° C., for example, room temperature (while standing) or at about 100° C. The curing temperature of the composition of the present invention is particularly preferably within a range from 10 to 50° C. As a matter of course, heating to a temperature of from about 120 to 250° C. required for curing of a conventional resol resin enhances the curing rate and removes excess moisture content and volatile content and, therefore, it is preferred.

The resol-type phenol resin (A) may be incorporated in an amount small enough to appropriately wet the surface of fillers made of the component (B) and various materials and base materials, or in a large enough amount to convert the resol-type phenol resin into a slurry.

Examples of various materials and base materials to which the resol-type phenol resin composition of the present invention is applied include inorganic substances such as stone and glass in the form of a powder, sand, pebbles and fist-sized solid matter; organic substances such as polymers in the form of a powder, particles, solid matter, plates and bars; fibers, paper and wood cuts made of natural products; or mixtures thereof.

EXAMPLES

The following Examples and Comparative Examples further illustrate the present invention in detail. In the Examples and Comparative Examples, parts and percentages are by weight unless otherwise indicated.

Examples 1 to 6

According to the formulation shown in Table 1(1) to Table 1(2), the respective components were mixed with stirring and 10 g of the mixture was put into a 50 ml beaker and then allowed to stand at a temperature of 15 or 100° C. When curing was completed within 24 hours, the time required to complete the curing was determined visually or by touching. As the resol resin, a water-soluble phenol resin [Phenolite UG-9750, manufactured by DAINIPPON INK & CHEMICALS, Inc.] was used. The results are shown in Table 1(1) to Table 1(2).

Comparative Examples 1 to 6

According to the formulation shown in Table 2(1) to Table 2(2), the respective components were mixed with stirring and 10 g of the mixture was put into a 50 ml beaker and then allowed to stand at the temperature conditions of 15 or 100° C. When curing was completed within 24 hours, the time required to complete the curing was determined visually or by touching. Otherwise, the state of curing after 24 hours was evaluated. As the resol resin, a water-soluble phenol resin [Phenolite UG-9750, manufactured by DAINIPPON INK & CHEMICALS, Inc.] was used. The results are shown in Table 2(1) to Table 2(2). An alkali substance remained in the cured articles obtained in Comparative Examples 1 to 2 and an acidic substance remained in the cured articles obtained in Comparative Examples 3 to 4 and, therefore, they are not desirable.

TABLE 1 (1)

| Items | Example 1 | Example 2 | Example 3 |
|---|---|---|---|
| Resol resin (parts) | 100 | 100 | 100 |
| Magnesium oxide (parts) | 1 | 10 | 5000 |
| Calcium hydroxide (parts) | | | |
| Barium hydroxide (parts) | | | |
| Aluminum thiosulfate (parts) | 10 | 1 | 0.01 |
| Curing temperature (° C.) | 15 | 15 | 15 |
| Cured state | cured completely | cured completely | cured completely |
| Curing time | 5 hours | 1 hour | 5 hours |

TABLE 1 (2)

| Items | Example 4 | Example 5 | Example 6 |
|---|---|---|---|
| Resol resin (parts) | 100 | 100 | 100 |
| Magnesium oxide (parts) | 1 | | |
| Calcium hydroxide (parts) | | 1 | |
| Barium hydroxide (parts) | | | 1 |

TABLE 1 (2)-continued

| Items | Example 4 | Example 5 | Example 6 |
|---|---|---|---|
| Aluminum thiosulfate (parts) | 0.1 | 0.1 | 0.1 |
| Curing temperature (° C.) | 100 | 100 | 100 |
| Cured state | cured completely | cured completely | cured completely |
| Curing time | 24 hours | 10 minutes | 15 hours |

TABLE 2 (1)

| Items | Comp. Example 1 | Comp. Example 2 | Comp. Example 3 |
|---|---|---|---|
| Resol resin (parts) | 100 | 100 | 100 |
| 48% NaOH ag. (parts) | 10 | 10 | |
| 50% PTS aq.*[1] (parts) | | | 10 |
| Curing temperature (° C.) | 15 | 100 | 15 |
| Cured state | uncured | cured softly | cured completely |
| Curing time | >24 hours | >24 hours | >24 hours |

*[1]50% PTS ag.: aqueous 50% paratoluenesulfonic acid solution

TABLE 2 (2)

| Items | Comp. Example 4 | Comp. Example 5 | Comp. Example 6 |
|---|---|---|---|
| Resol resin (parts) | 100 | 100 | 100 |
| Calcium hydroxide (parts) | | | 1 |
| 48% NaOH ag. (parts) | | | |
| 50% PTS aq.*[1] (parts) | 1 | | |
| Aluminum thiosulfate (parts) | | | 1 |
| Curing temperature (° C.) | 100 | 100 | 100 |
| Cured state | cured softly | uncured | cured softly |
| Curing time | >24 hours | >24 hours | >24 hours |

What is claimed is:

1. A method for curing a resol resin, which comprises curing, at a temperature of from 10 to 110° C., a resol resin composition consisting essentially of a resol phenol resin (A), an alkali earth metal oxide and/or an alkali earth metal hydroxide (B), and ammonium thiosufate (C).

2. A method for curing aresol resin according to claim 1, wherein the alkali earth metal oxide and/or the alkali earth metal hydroxide (B) are an oxide and/or a hydroxide of magnesium, calcium or barium.

* * * * *